W. A. WOOD.
Harvester-Rakes.

No. 150,927. Patented May 12, 1874.

Witnesses.
Alex Mahon
N. B. Smith

Inventor.
Wm Anson Wood
by A. M. Smith
Attorney

UNITED STATES PATENT OFFICE

WILLIAM A. WOOD, OF ALBANY, NEW YORK.

IMPROVEMENT IN HARVESTER-RAKES.

Specification forming part of Letters Patent No. 150,927, dated May 12, 1874; application filed December 26, 1873.

*To all whom it may concern:*

Be it known that I, WILLIAM ANSON WOOD, of Albany, county of Albany and State of New York, have invented certain new and useful Improvements in Reel-Rakes for Harvesting-Machines, of which the following is a full, clear, and exact description, reference being had to the accompanying drawings, making part of this specification, in which—

Figure 1:
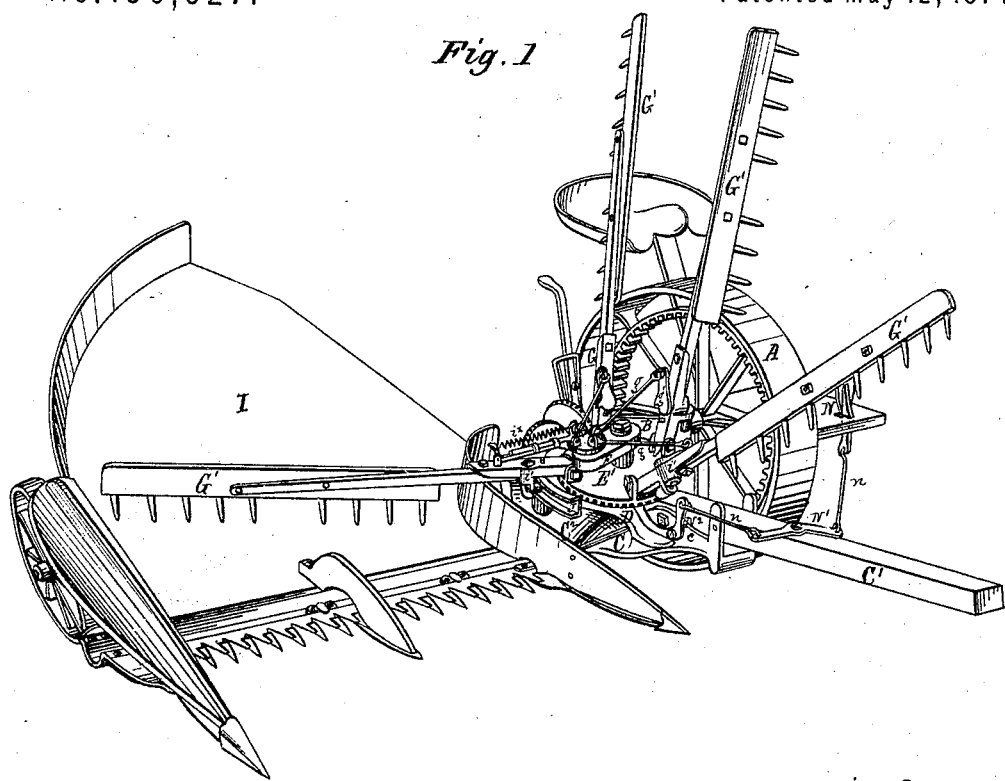
Figure 2:
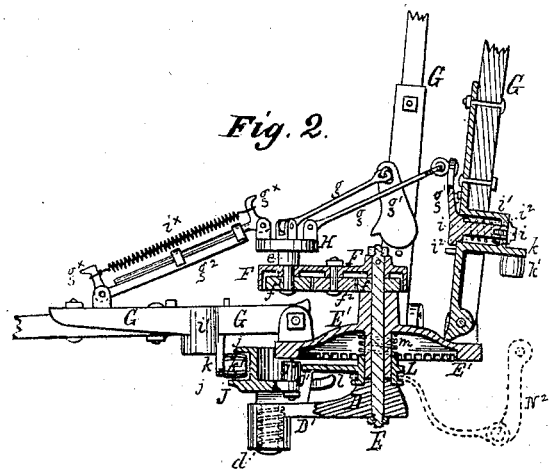
Figure 3:
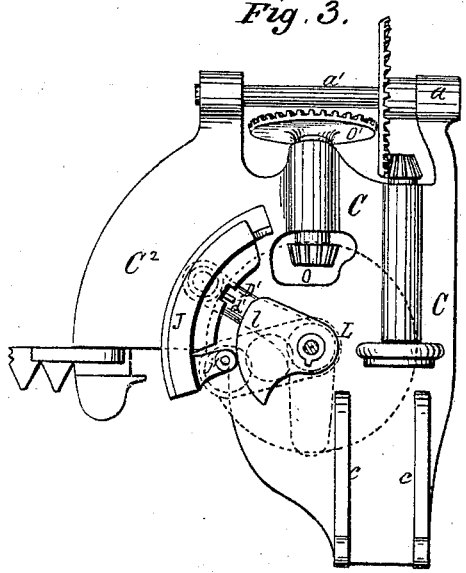

Figure 1 represents a perspective view of a harvesting-machine with my improvements applied. Fig. 2 represents a vertical section through the reel-rake attachment; and Fig. 3 is a plan view of the main or gear frame, showing the relation thereto of the rake-gearing, partly in full and partly in dotted lines.

Similar letters of reference denote corresponding parts in all the figures.

The invention relates to that class of combined rake and reel in which the rake and reel arms have imparted to them a continuous rotary movement around a common vertical or nearly vertical shaft, and in which the rising and falling movements of said arms are effected by links having a point of attachment eccentric to the rake and reel shaft; and consists, first, in a mechanism employed for imparting a positive rotation to the eccentrically-arranged pivot, to which the rake and reel links are connected, timed to and moving at the same rate of speed with the rake and reel shaft. Second, the invention consists in a novel construction of yielding or automatically extensible links with the rake and reel arms, for connecting said arms with the eccentric link-pivot, whereby they are adapted to act either as rake or reel arms, at the option of the attendant, and to follow the different paths incident to the performance of such different functions, as required; third, in the combination of a vertically-pivoted track, for giving direction to or controlling the path of the arms when acting as rake-arms, with a cam on the rake-shaft, which automatically moves said track outward to engage with and control the arm, and a spring for withdrawing the track after such rake-arm has passed by; and, lastly, in certain details of construction and arrangement for carrying into effect the above-recited improvements, as hereinafter explained.

In the accompanying drawings, A represents the main ground or driving wheel, which is mounted upon a stub-axle connected with the forward end of an adjustable sector-plate, B, which, at its rear end, is mounted and turns upon an extension of the sleeve $a$, which forms the outer main-frame bearing for the pinion-shaft $a'$. The main frame C, which at its rear end is provided with the sleeve-bearings $a$ for the pinion-shaft $a'$, extends thence forward, and is provided at its forward end with vertical flanges $c$, for the reception and adjustment of the pivoted tongue $C^1$. Between the bearings $a$ and tongue $C^1$ the frame C droops into runner or shoe form, is expanded in width, and at its inner drooping side $C^2$ is provided with a suitable socket for the reception and retention of the inner end of the finger-bar placed about opposite the tread of the driving-wheel. Between the inner end of the finger-bar and drive-wheel, and about in the same transverse plane with the former, is located the vertical rake-pivot E, supported in a supplemental rake frame or standard, D, which is bolted to the top of the main frame C, and upon this pivot or shaft E is mounted the crown or bevel wheel E', to the upper face of which, or to a rotating head connected therewith, the rake and reel arms G, arranged either radially or tangentially, as preferred, are pivoted in any usual or preferred manner. The upper end of the crown-wheel sleeve is armed with a spur-pinion, $f$, either cast with or keyed to and turning with said sleeve and crown-wheel, and above the pinion $f$ a horizontal arm, F, also constituting a case or cover, is secured to the stationary rake shaft or pivot E; and in the outer end of this case or arm F, which inclines slightly forward from the line or plane of the finger-bar, is mounted a second pivot or shaft, $e$, the upper end of which is provided with a rotating head, H, to which the reel and rake arms G are connected by links $g$. The lower end of the link shaft or pivot $e$ is armed with a pinion, $f^1$, of the same size as the pinion $f$ on the crown-wheel sleeve, from which motion in the same direction and at the same velocity is imparted to the pinion $f^1$ through an intermediate pinion, $f^2$, mounted on a pendent pivot, $e'$, in the arm or inclosing-case F. The arrangement of the link-shaft $e$ and its rotating head H, to which the links $g$ are connected eccentrically to the rake shaft or head E', serves to impart the rising and falling or vertical movements of the rake and reel arms necessary to enable them to pass the drive-wheel and the driver seated on the machine, and to permit the rake-heads G' to descend into the standing grain, and to pick up lodged and fallen grain, present the same to the cutters, and deposit it, after it is cut, on the platform I. The point at which the rakes descend into the grain may be regulated, if desired, by the adjustment of the arm F forward or backward relatively to the plane of the cutting apparatus.

The links $g$ are jointed and extensible, the two parts being connected, one, $g$, at one end to the head H, and at the other end to the part $g'$, which, at its inner end, is provided with a pivot, $i$, mounted in a socket, $i^1$, in the rake-arm. A spring, $i^2$, surrounding the pivot within the socket $i^1$, serves by its tension to prevent any yielding or extension of the jointed link when the arms G act as reel-arms only, and in which case they pursue a uniform path; but when the arms G are caused to act as rake-arms, as hereinafter explained, the spring yields, and permits the deflected parts $g\ g'$ to approach a right line, effecting an elongation of the link necessary to permit such change of path. After the rake-head has passed over the platform and discharged the grain, the tension of the spring $i^2$ retracts it to its former position for passing the wheel on its return movement, and causes it to assume its normal relation of reel-beater.

The devices for giving direction to the arms G, when acting as rake-arms, are as follows: A horizontal segment, J, provided on its outer face with horizontal lips or flanges $j$, is connected, by a vertical pivot near or slightly in rear of the center of its length, with an arm, D', of the rake-standard D, a spring, $d$, surrounding said pivot, serving, by its tension, to draw and hold the forward end of the segment inward toward the rake-shaft and out of the way of the rake and reel arms, its inward movement being limited by a stop, $d'$. The flanges $j$ form, between them, a curved horizontal groove or way, and a friction-roller, $k'$, mounted on a horizontal stud on a lug or bracket, $k$, attached to the rake and reel arms G, moves within said groove when the arms act as rakes, but which freely passes by the upper flange $j$, when the segment J is withdrawn, for permitting the arms to act as gathering-arms or reel-beaters only. Upon the lower sleeve of the crown-wheel E', and resting upon a shoulder on the supporting-standard D, is placed a cam-sleeve, L, feathered to and rotating with the crown-wheel sleeve, but free to slide up and down thereon, and held in place by a spring, $m$. A cam or cams, $l$, formed upon or attached to this rotating sleeve L, act upon a friction-roller, $j'$, mounted upon the forward end of the pivoted way J at each revolution of the rake-shaft, and force said end outward, causing the friction-roller $k'$ to engage with the grooved way J as the rake-arm G passes over the cutters, thereby retaining said arm in its depressed relation until the rake-head connected therewith has swept the grain off the platform, when it is lifted again, as before explained. The cam $l$ may be duplicated, if desired, and thus one, two, or more of the rake-heads may be made to act as rakes, as desired. In turning corners, or whenever the condition of the grain is such that it is desired to allow it to remain longer upon the platform than it would if acted upon by the regular rotation of the cam $l$, said cam may be raised by sliding its sleeve upward on the sleeve of the crown-wheel E', and thus causing it to pass above the roller $j'$, and without actuating the same, and this is accomplished by the driver, in his seat, pressing his foot upon a lever, F, and thereby, through links $n\ n$ and levers $N^1$ and $N^2$, or other convenient arrangement for the purpose, acting upon said sleeve L, overcoming the tension of spring $m$, and raising the cam, which, as soon as the pressure of the foot or hand is withdrawn, is returned to its normal position by the spring $m$, and again throws the rake-track into action, as before. The crown or rake wheel E' is driven by a bevel-pinion, O, on the forward end of a longitudinal shaft, the rear end of which is provided with a bevel-wheel, which engages with and is driven by a bevel-pinion on the pinion-shaft $a'$; but any preferred arrangement of driving mechanism may be used.

Parts not particularly described may be constructed in any usual or preferred manner, and of those described it will be obvious that, although a particular form or construction of main frame, and the arrangement of the drive-wheel and pinion-shaft and cutting apparatus relative thereto, have been described in showing how the invention may be carried out in practice, other forms of main frame and arrangement of drive-wheel and cutting apparatus relative thereto may be employed in lieu of those described.

What I claim as new, and desire to secure by Letters Patent, is—

1. The eccentrically-arranged rotating head H, to which the reel and rake arms are linked, driven from the rake and reel shaft, so as to give a positive rotation to said head in the same direction with, and timed to, the movements of the rake and reel shaft, substantially as described.

2. The arm F, which supports the rotating eccentrically-arranged head H, made also to cover or inclose and protect the gearing for operating said head, substantially as described.

3. The link $g$ and pivoted arm $g'$, with its pivot $i$ and retracting-spring $i^2$, forming an extensible link-connection between the rake-arm and rotating head H, substantially as and for the purpose specified.

4. The flanged or horizontally-grooved track

J, connected by a vertical pivot with its supporting-standard, and operating substantially in the manner and for the purpose described.

5. The cam $l$, rotating with the rake and reel carrier or shaft, in combination with the vertically-pivoted way or track J, arranged and operating as described.

6. The cam-sleeve L, feathered upon, and rotating with, the crown-wheel sleeve, as described, and for the purpose set forth.

WM. ANSON WOOD.

Witnesses:
C. B. TILLINGHAST,
FRANK WOOD.